Aug. 6, 1963 H. ARNDT 3,099,982
ANIMAL CAPTURING DEVICE
Filed Nov. 21, 1960
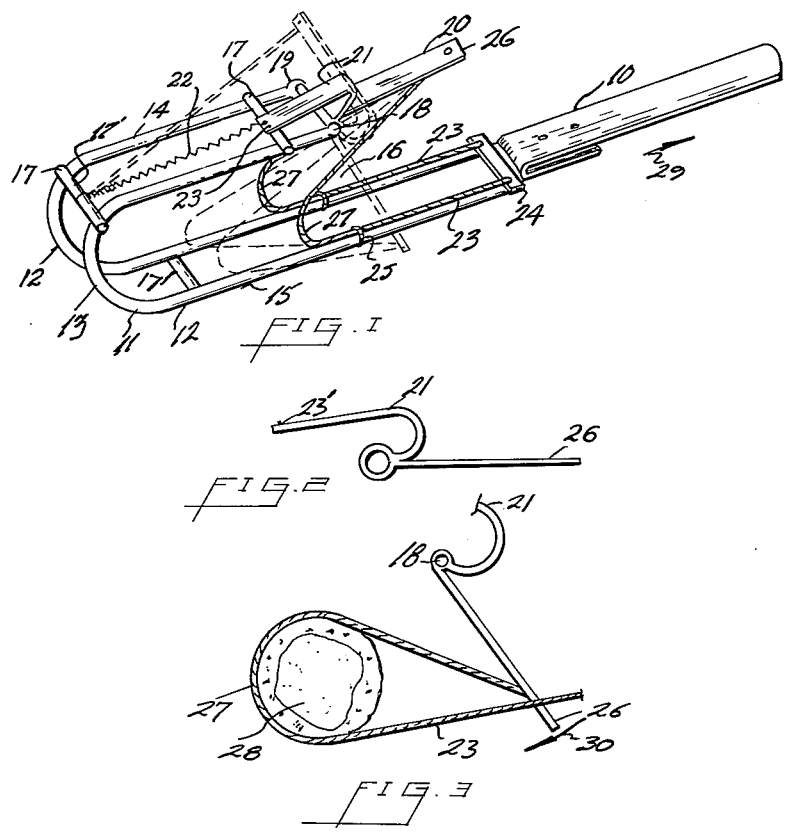
INVENTOR
HUGO ARNDT
By
HIS ATTYS the pivot pin and includes a counter arcuated portion 21 formed integrally therewith which acts as a spring anchor lever.

A spring 22 extends between the extremity 23' of this lever 21 and one of the cross bars 17' spanning the rods 11. This spring normally maintains the lever 20 substantially parallel with the main portions 15 of the rods 11 as clearly shown in FIGURE 1.

A pair of leg engaging cords 23 are secured by one end thereof to a cross bar 24 adjacent the handle 10 and extend parallel to the main portions 15 of the rods and are tied to these main portions as indicated at 25.

These cords then loop loosely and converge to a common anchoring point on the outer end 26 of the actuating lever 20, so that the cord loops 27 span loosely the gap 16 between the ends 19 of the rod portions 14 and the portions of the rods 15 directly opposite thereto.

In operation, these loose loops 27 are engaged around the leg or legs 28 of the animal whereupon movement of the handle in the direction of arrow 29 or, of course, movement of the animal away from the operator, causes the loops to move towards the arcuate portions 13 thus pulling down the lever 20 pivoting upon pin 18 against pressure of spring 22.

The actuating lever takes up the position shown in full line in FIGURE 3 and if the animal struggles further, moves in the direction of arrow 30 to take up the position shown in phantom line thus wrapping the cords completely around the leg or legs 28.

As soon as it is desired to release the animal, the device is moved towards the animal in a direction opposite to arrow 29 thus permitting spring 22 to reverse the position of the actuating lever and return it to the position shown in FIGURE 1 thus opening the cords and allowing the animal to escape readily.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for catching and holding an animal's leg, comprising in combination a frame comprising a pair of spaced parallel J-shaped side members and a plurality of spaced cross bars rigidly connecting the same together, said side members including relatively long arm portions, relatively short arm portions and connecting bight portions, a handle secured to outer ends of the long arm portions of said side members, a fulcrum pin extending transversely between outer ends of the short arm portions of said side members, a swingable lever mounted intermediate its ends on said fulcrum pin, said lever having first and second limbs and being swingable from an open position wherein the first limb thereof projects substantially longitudinally outwardly from the outer ends of said short arm portions to a closing position wherein said first limb is received in and projects through the space between said long arm portions of the side members, resilient means connected to the second limb of said lever and biasing the same to its open position, and a pair of flexible leg engaging cords secured at one end thereof to the respective long arm portions at points substantially opposite the outer ends of the short arm portions of the side members, the other end portions of said cords being mutually convergent and anchored at a common point to the free end portion of said first limb of said lever, whereby the cords may be wrapped around an animal's leg by swinging of the lever to its closing position against the action of said resilient means.

2. The device as defined in claim 1 wherein one of said cross bars of said frame is engageable by and provides abutment means for the second limb of said lever when the latter is in its open position.

3. The device as defined in claim 1 wherein one of said cross bars of said frame is engageable by and provides abutment means for the second limb of said lever when the latter is in its open position, said resilient means comprising a tension spring connected at one end thereof to said second limb and anchored at its other end to another one of the cross bars of said frame.

References Cited in the file of this patent
UNITED STATES PATENTS

| | | |
|---|---|---|
| 404,583 | Wickham | June 4, 1889 |
| 640,199 | Holland | Jan. 2, 1900 |
| 884,156 | Hitt | Apr. 7, 1908 |